April 17, 1951     R. D. DESSO     2,549,675
TIRE CHAIN HOOK

Filed July 20, 1949

INVENTOR.
Rufus D. Desso
BY *Victor J. Evans & Co.*
ATTORNEYS

Patented Apr. 17, 1951

2,549,675

UNITED STATES PATENT OFFICE 2,549,675

TIRE CHAIN HOOK

Rufus D. Desso, Somers, Conn.

Application July 20, 1949, Serial No. 105,754

3 Claims. (Cl. 152—242)

The present invention relates to the general class of automotive vehicle wheels of the pneumatic tire type and anti-skid chains for the tires, and more particularly to an improved tire chain hook or fastening device for attaching the ends of the cross anti-skid tread chains to the annular side chains employed on the wheel tire. The primary purpose of the invention is the provision of a device of this character that is simple in construction and may be manipulated with facility, and without the aid of hand tools, for initially attaching the cross chains to the side chains, for removing worn cross chains, and for replacing the worn chains with new chains. The attaching devices include a minimum number of parts, as a locking plate and a coupling link, that may be manufactured with facility at low cost of production, and the parts may be assembled with convenience and installed with ease to insure strong and durable fastening means for the cross chains. The invention consists in certain novel features of construction, and combinations and arrangements of parts with standard and conventional types of side chains and cross chains, as will hereinafter be described, and more specifically set forth in the appended claims.

In the accompanying drawings I have illustrated a complete example of a physical embodiment of my invention in which the parts are combined and arranged in accord with one mode I have devised for the practical application of the invention. It will however be understood that changes and alterations are contemplated and may be made in these exemplifying drawings and mechanical structures, within the scope of my claims without departing from the principles of the invention.

Figure 1:
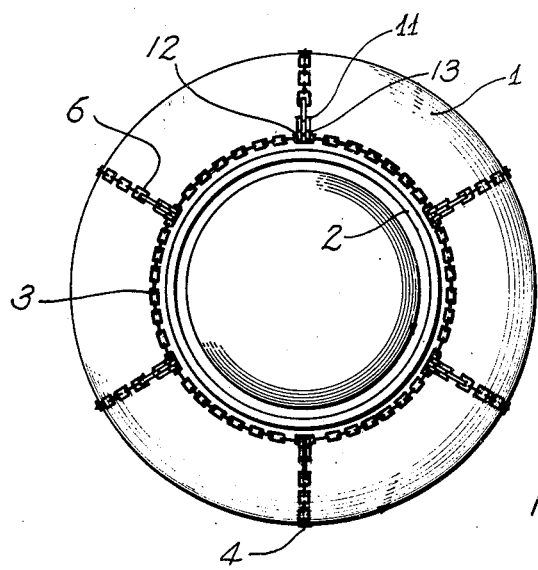
Figure 1 is a side view of a wheel tire equipped with the anti-skid chains in which my invention is embodied.

In order that the general arrangement and utility of parts may readily be understood I have shown in Fig. 1 a conventional pneumatic tire 1 and its felly or rim 2, together with one of two annular anchoring chains, or circumferentially arranged side chains 3 for the tire, and a number of anti-skid cross chains or tread chains, as 4.

Figure 2:
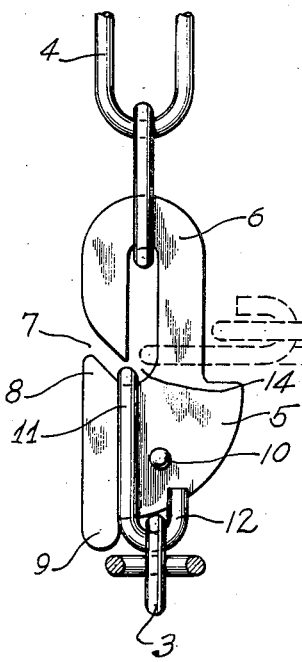
Figure 2 is a side view of the fastening devices showing the connection to the side chain and a cross chain.
Figure 3:
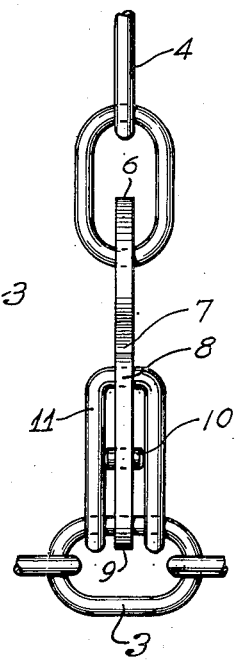
Figure 3 is a face view of a fastening device looking at the joint between the side chain and a cross chain at the upper portion of Fig. 1.
Figure 4:
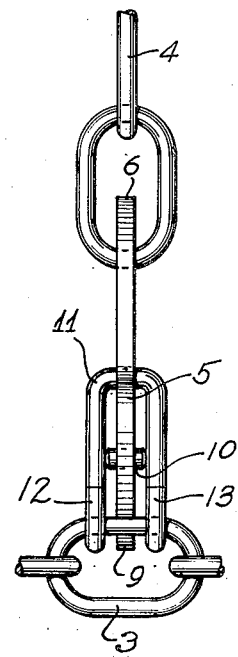
Figure 4 is a reverse view of the structure in Fig. 3.

The ends of the cross chains 4, which are made up of conventional links, are both equipped with fastening plates and coupling links that are radially disposed about the tire with the inner edges at the left in Fig. 2 adjacent the tire.

Each flat locking plate, on its outer edge, or the right edge in Fig. 2 is fashioned with a rounded jaw 5 forming a shoulder, and the upper portion of the plate terminates in an inverted U-shaped hook 6, which at the approximate central portion of the plate opens outwardly through a diagonal entry slot 7 that forms a hook 8.

Below the hook or lug 8, the straight inner edge of the plate terminates in a rounded boss 9, and a transverse hole is drilled in the body of the plate for the reception and retention of an oppositely projecting pin 10 that may be welded, or otherwise rigidly fastened to the plate.

The dual coupling link for fastening the cross chain to the locking plate is here shown as a double wire hook with a link 11 for attachment to the locking plate, and two integral U-shaped loops 12 and 13 for engagement with a longitudinal side bar of one of the links of the annular side chain 2.

In fastening a cross chain to a side chain, the end link of the cross chain is entered through diagonal slot 7 and slipped up into the end of the opening in the U-shaped hook 6. The two hooks 12 and 13 of the coupling link, in dotted position of Fig. 2, are slipped under a straight side bar of a link of the side chain 3, and then the double wire hook 11 is slipped into the entry slot 7 to seat in a depression or pocket 14, where it obstructs accidental dislodgement of the cross chain 4.

The wall of the pocket 14 forms a fulcrum for the coupling link, as the hooks 12, 13 with the chain 2 are swung around the arcuate edge of jaw 5 of the plate from dotted position, to full line position in Fig. 2.

The ends of pin 10, projecting slightly into the path of the two resilient legs of the link 11, slightly spread apart the legs as they are swung under hand pressure, and the legs thus snap over the ends of the pin and swing into alinement with the plate. The link of the chain 2 is thus confined and locked in the two hooks 12 and 13 which coact with the plate to prevent escape of the link, and the boss 9 of the plate forms a barrier or abutment for the confined bar of the link of chain 2.

When a cross chain is worn or broken, it may readily be removed by a reversal of the steps in the above described operation, which is facilitated by the flexibility of the side chains and the cross chains, and the resilience of the various fastening links.

Having thus fully described my invention, what I claim as new and desire to secure by Letters Patent, is:

1. In an anti-skid device for use with an annular side chain and a cross tread chain, the combination with a locking plate having a U-shaped hook in engagement with the end link of a cross chain and an entry slot terminating in a pocket, of a resilient coupling link seated in the pocket and having a pair of U-shaped hooks engaging a link of the side chain, and a pair of oppositely extending lateral bosses on the plate in the path of movement of the resilient locking link.

2. A locking plate for use with a coupling link in fastening a tread chain to a side chain, said plate having an inverted U-shaped hook at one end and an edge-lug projecting from its opposite end, a diagonally extending entry slot opening to the hook and forming a seat, a rounded jaw extending from the edge lug and terminating at the base of the hook, and a pair of oppositely extending lateral bosses on the plate located between said seat and the rounded jaw.

3. In an anti-skid device including an annular side chain and a cross tread chain, the combination with a locking plate having a hook in engagement with the end link of a cross chain and an entry slot terminating in a pocket forming a fulcrum-seat, of a resilient coupling link seated in the pocket and having a pair of U-shaped hooks engaging a link of the side chain, a pair of laterally extending bosses on the plate in the path of swinging movement of the resilient link, and an end lug at one edge of the plate for confining the link of the side chain.

RUFUS D. DESSO.

REFERENCES CITED

The following references are of record in the file of this patent:

UNITED STATES PATENTS

| Number | Name | Date |
|---|---|---|
| 1,239,993 | West | Sept. 11, 1917 |
| 1,450,981 | McLoughlin | Apr. 10, 1923 |
| 2,462,472 | Cuillierrier | Feb. 22, 1949 |